United States Patent [19]
Zerrer

[11] Patent Number: 4,761,939
[45] Date of Patent: Aug. 9, 1988

[54] BRUSHCUTTER

[75] Inventor: Gerhard Zerrer, Korb, Fed. Rep. of Germany

[73] Assignee: Andreas Stihl, Waiblingen, Fed. Rep. of Germany

[21] Appl. No.: 84,212

[22] Filed: Aug. 12, 1987

[30] Foreign Application Priority Data

Aug. 29, 1986 [DE] Fed. Rep. of Germany ... 8623173[U]

[51] Int. Cl.⁴ .......................................... A01D 38/46
[52] U.S. Cl. .............................. 56/12.7; 56/DIG. 18; 56/239; 30/276
[58] Field of Search ........ 56/12.7, 239, 233, DIG. 18, 56/17.5, 255; 30/276, 298, 340; 200/157, 298

[56] References Cited

U.S. PATENT DOCUMENTS

| | | | |
|---|---|---|---|
| 3,959,879 | 6/1976 | Sellers | 30/276 |
| 4,216,363 | 8/1980 | Nofel | 200/157 |
| 4,236,310 | 12/1980 | Muller | 30/276 |
| 4,295,285 | 10/1981 | Stevens | 56/294 |
| 4,360,971 | 11/1982 | Fellman | 30/276 |
| 4,696,108 | 9/1987 | Zerrer et al. | 30/296 R |

Primary Examiner—John Weiss
Attorney, Agent, or Firm—Walter Ottesen

[57] ABSTRACT

A brushcutter has a supporting tube having a first end and a second end with a drive motor arranged at the first end and a cutterhead mounted on the second end. A handle is mounted on the supporting tube for manipulating the brushcutter. The handle has a tubular-shaped handle portion which can be attached to the supporting tube without first disassembling the latter from the motor or the cutterhead. This is achieved configuring the tubular-shaped handle portion to be made of two clamshells which conjointly define a partition plane in the direction of the longitudinal axis of the supporting tube. One of the clamshells holds all control components and is directly mounted on the supporting tube by means of a pipe clamp. The other clamshell is laterally attached to the first clamshell.

11 Claims, 4 Drawing Sheets

BRUSHCUTTER

FIELD OF THE INVENTION

The invention relates to a brushcutter having a drive motor which is mounted on one end of a supporting tube. The motor is connected via a drive shaft disposed in this tube with a gear of a cutting work tool mounted at the other end of the supporting tube. A handle is provided for manipulating the brushcutter. The handle includes a tubular-shaped handle portion which surrounds the supporting tube. Operating components such as the gas lever, switches and the like are premounted on this tubular-shaped handle portion.

BACKGROUND OF THE INVENTION

It is conventional to equip a brushcutter with handles of different types which can be selected and with which the operator of the brushcutter manipulates the same. In order to be able to deliver the brushcutter equipped with a specific handle desired by the customer, it has been shown to be advantageous if the dealer maintains a supply of handles of various kinds separate from the brushcutter itself so that the desired handle can be mounted on the brushcutter by the dealer or even by the customer. A conventional handle configuration has the shape of a steering bar and is not difficult to mount on the brushcutter in a later mounting step. However, the follow-on mounting of a handle does provides difficulties when the handle is of kind which has a tubular handle portion and is to be grasped by the hand and which is to be pushed onto the supporting tube of the brushcutter and has operating components such as a gas lever, switches and similar parts. In this situation, the supporting tube must be disassembled from the drive motor which is mounted on one of its ends in order to be able to push the handle over the tube. Also, the operating parts can change in their position when the handle is pushed onto the supporting tube and thereafter tightened. This change of position of the handle can lead to operational problems.

SUMMARY OF THE INVENTION

It is an object of the invention to provide a brushcutter having an accessory handle which is intended for later mounting and which has a tubular-shaped handle portion. The brushcutter is so configured that the tubular-shaped handle portion can be mounted on the supporting tube without the necessity of first separating the motor from this supporting tube.

According to a feature of the invention, the tubular-shaped handle portion is configured so that it is made of two parts conjointly defining a partition plane lying in the axial direction of the supporting tube. The tubular-shaped handle portion includes two handle clamshells and the operating components for the brushcutter are all mounted entirely in one of the clamshells.

As a consequence of this configuration, the two handle clamshells can be simply placed upon the supporting tube from mutually opposite longitudinally extending sides thereof so that the tubular-shaped handle portion need not be axially pushed onto the supporting tube. Since the operating components are premounted in one of the clamshells, their position in the one clamshell remains unchanged during assembly of the handle. If the attachment parts for the supporting tube are arranged in this same one clamshell, then this handle clamshell can be first very simply attached onto the supporting tube and thereafter the other handle clamshell can be mounted so that final assembly requires only simple connecting members for both handle clamshells.

BRIEF DESCRIPTION OF THE DRAWING

The invention will now be described with reference to the drawing wherein.

DESCRIPTION OF THE PREFERRED EMBODIMENTS OF THE INVENTION

Figure 1:
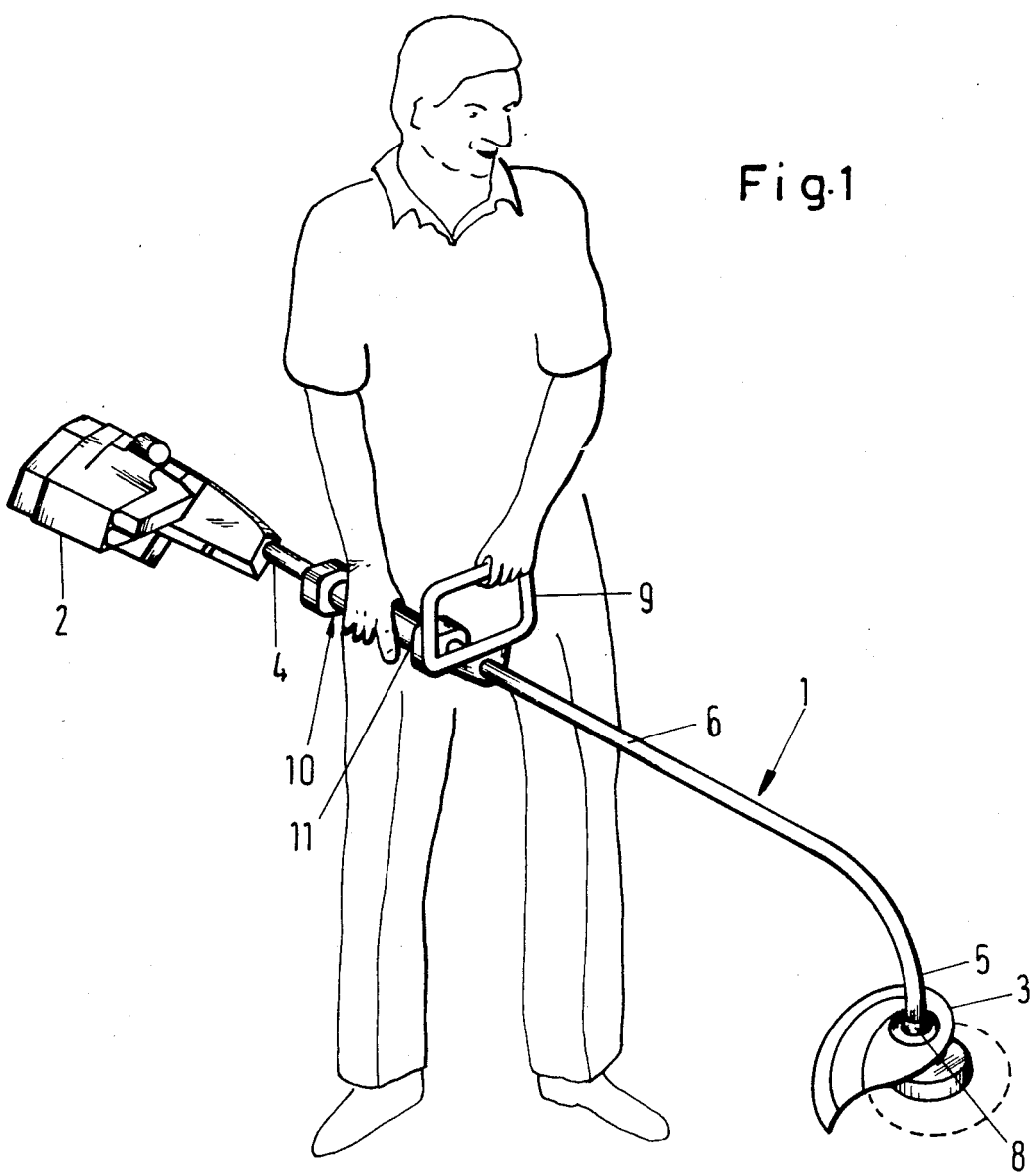
FIG. 1 is a perspective view of a brushcutter held in its operating position.
Figure 2:
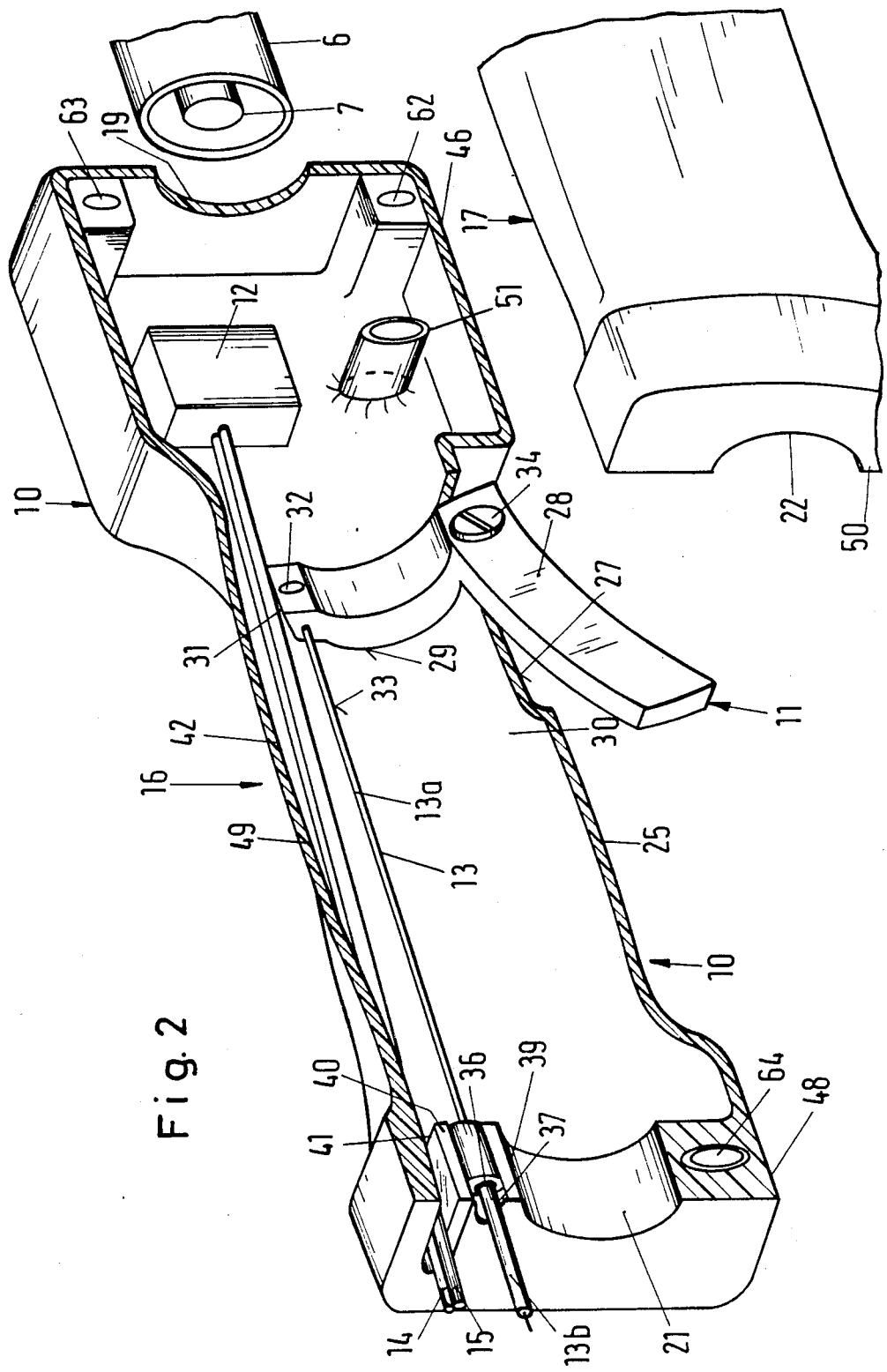
FIG. 2 is a perspective view of the two handle clamshells of the tubular-shaped handle portion before beginning the mounting thereof onto the supporting tubes.

The perspective view of FIG. 1 shows the brushcutter 1 in its operating position. The brushcutter includes a drive motor 2 and a cutterhead 3 of which a portion of the deflector is broken away and the path traced by the work tool is shown by a dashed circular line. The motor 2 and the cutterhead 3 are mounted on mutually opposite ends 4 and 5 of a supporting tube 6. A drive shaft 7 is shown in FIG. 2 as being mounted in the supporting tube 6 and is driven by the motor 4. The work tool of the cutterhead is driven by the drive shaft 7 via gear means in the usual manner. The supporting tube 6 is attached to the housing 8 of the gear means.

Figure 3:
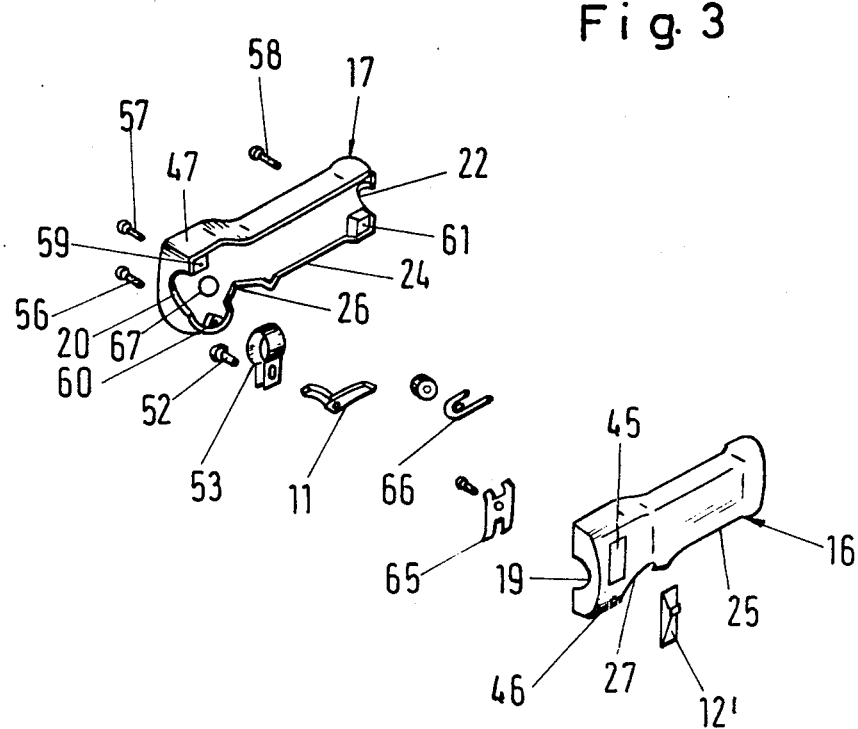
FIG. 3 is an exploded perspective view of the two part tubular-shaped handle portion showing the individual parts mounted therein; and, FIG. 4 is a perspective view, partially in section, of a portion of one of the handle clamshells.

A handle is mounted on the supporting tube 6 and comprises a bale-handle portion 9 and a tubular-shaped handle portion 10 so that the brushcutter can be held with both hands and manipulated in the manner shown in FIG. 1. The handle portion 10 is partitioned in the axial direction and includes two clamshells 16 and 17 (FIGS. 2 and 3). Operating components are mounted in clamshell 16 and include a gas lever 11, an electrical switch 12, a Bowden cable 13, and a cable having two leads 14 and 15 which are connected to the motor 2 and lead to switch 12. The switch 12 has several functions and is actuated by a key 12' (FIG. 3). The key 12' projects outwardly from an opening 45 of the clamshell 16. With switch 12, a motor winding can be short circuited so that the drive of the work tool can be brought to an immediate stop in dangerous situations. The Bowden cable 13 leads from the gas lever 11 to the drive motor 2.

The two clamshells 16 and 17 are made of plastic and produced by injection molding. The clamshell 17 is empty and constitutes a cover for the clamshell 16. The two handle clamshells 16 and 17 are so configured that they conjointly define the tubular-shaped handle portion 10 and tightly surround the supporting tube 6 in the assembled condition. For this purpose, two semi-circular recesses (19, 21) and (20, 22) are provided in corresponding ones of the end faces of the respective clamshells as shown in FIGS. 2 and 3. Each two mutually adjacent recesses (19 and 20) and (21 and 22) conjointly define respective pass-through openings for accommodating the supporting tube 6.

The gas lever 11 has an actuating handle 28 which projects outwardly through a rectangular pass-through opening of handle portion 10 as shown in FIG. 2. For this purpose, recesses 26 and 27 are provided in the region of the gas lever on the mutually adjacent edge surfaces 24 and 25 of the two clamshells. The recesses 26 and 27 conjointly define the pass-through opening for the handle 28 in the partition plane of the handle portion 10 as shown in FIGS. 2 and 3.

The gas lever 11 has a guide portion 29 which is configured as a section of a cylinder. The guide portion 29 has an outer surface which lies against the base 30 of the clamshell 16 and an inner surface which lies against the supporting tube 6 when the handle portion 10 is completely assembled. The free end 31 if the guide portion 29 is straight and has a hooking opening 32 into which the pull wire 13a of the Bowden cable 13 can be hooked with its end 33. The gas lever 11 is mounted so as to be piviotable about the shaft of an attachment screw 34 which penetrates the handle 28 and engages in the wall of the clamshell 16. In lieu of screw 34, a bearing pin could be utilized for which a correspondingly molded bearing bushing must be provided on the handle clamshell (not shown).

The outer casing 13b of the Bowden cable 13 is tightly clamped with a holding sleeve 36 in the region above the opening 21 (FIG. 2) in a pass-through opening 37 of clamshell 16. The sleeve 36 can be injection molded into the end wall of the clamshell 16. However, the sleeve is not absolutely necessary because the pass-through opening 37 is formed by two legs 39 and 40 which are integral parts of the end wall of the clamshell 16 and can be spring elastic. The mounting sleeve 36 can also be clamped between the spring elastic legs 39 and 40. The lower wall leg 39 shown in FIG. 2 is defined by the upper free edge portion of recess 21. The other wall leg 40 defines the lower boundary wall of a pass-through opening 41 for the cable (14, 15) the two leads 14 and 15 of which are thus within a defined space. The upper boundary wall of the pass-through opening 41 is formed by the thickened end-face portion of the wall 42 lying opposite the base 30.

The switch 12 lies in a widened end piece 46 of the clamshell 16. The clamshell 17 has a correspondingly widened end piece 47 (FIG. 3). The opposite lying end piece 48 of clamshell 16, which holds the Bowden cable 13 and the cable (14, 15) is likewise widened with respect to the center section 49 of the clamshell 16. However, the end piece 48 is widened less with respect to the center section 49 than the end pieces 46 and 47. The end piece 50 of clamshell 17 lying opposite end piece 48 has the same outer contour as the end piece 48.

Figure 4:
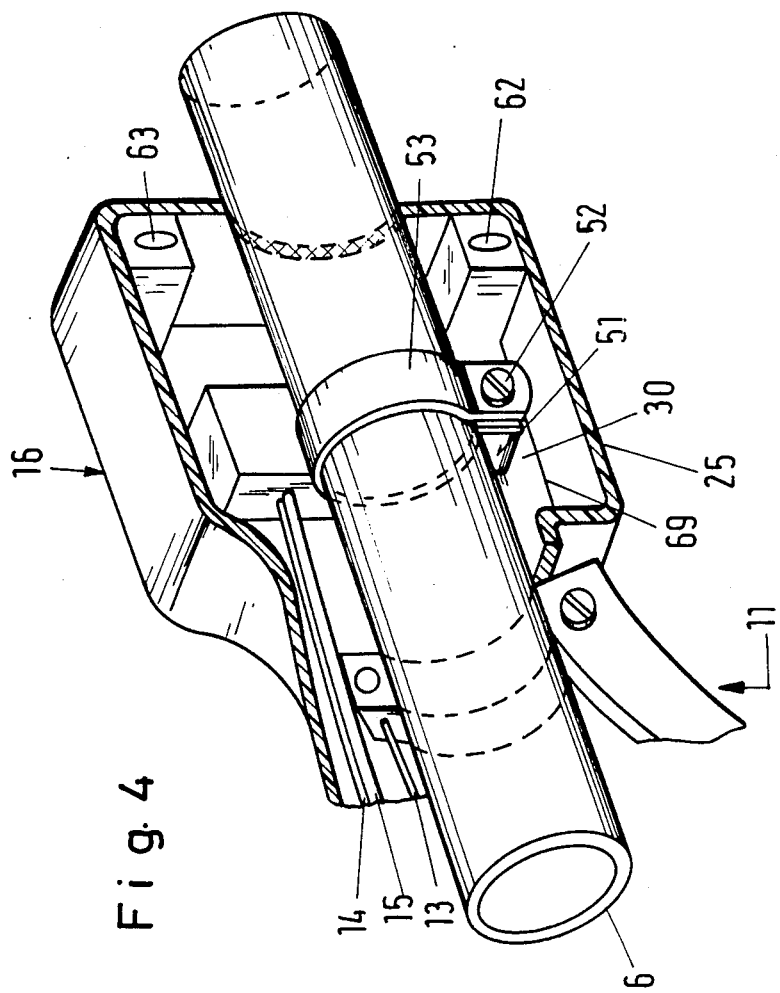

A receiving bushing 51 for an attachment screw 52 of a pipe clamp 53 is mounted in the end piece 46 of clamshell 16 as shown in FIGS. 2 and 4. The bushing is molded on the wall of the clamshell 16. The clamshell 16 is attached to the supporting tube 6 by means of the pipe clamp 53. After the pipe clamp 53 is placed on the supporting tube 6, the clamshell 16 is connected with the pipe clamp by means of an attachment screw 52 which can be threadably engaged with an internal thread (not shown) of the receiving bushing 51.

The other clamshell 17 can be mounted after the clamshell 16 is tightly attached to supporting tube 6. The clamshell 17 is attached with recessed screws 56, 57 and 58 for which pass-through bores 59, 60 and 61 are provided in clamshell 17 and in which threaded bores 62, 63 and 64 are provided in clamshell 16 (FIGS. 2 and 3). Thus, the clamshell 17 is not directly attached to the supporting tube 6; instead, it is mounted on clamshell 16 as a cover. The pass-through bores 59 to 61 and the threaded bores 62 to 64 are located in corner regions of the clamshells which are strengthend in these regions with reinforcing struts formed as part of the clamshell.

The key 12' of the switch 12 is actuated by a displacement in its longitudinal direction and is connected with an H-shaped contact spring 65 (FIG. 3) which permits the switch to be latched into predetermined positions, for example, at full throttle. The spring 65 is so configured and mounted that the key 12' automatically snaps back to a center position after being actuated in one direction. The key 12' is, like the handle 28 of the gas lever, easy to actuate with a finger without it being necessary for the operator to remove the hand from the handle portion 10. In a dangerous situation, the drive motor 2 can also be switched off by actuating the switch 12. A return spring 66 is provided for the gas lever 11 so that when the gas lever is released, the fuel metered to the drive motor is interrupted.

A cut out 67 (FIG. 3) is provided in the wall of the clamshell 17 lying opposite the receiving bushing 51 which provides access to the attachment screw 52 of the pipe clamp 53 by means of a screwdriver even when the handle part 10 is mounted. In this way, the handle part 10 can be somewhat loosened in the assembled condition on the supporting tube 6 and can then be rotated about the supporting tube so that a follow-up adjustment of the handle part 10 is possible. Also, the handle part 10 can be adjusted to a position other than the normal position with respect to the motor and to the cutterhead 3.

It is understood that the foregoing description is that of the preferred embodiments of the invention and that various changes and modifications may be made thereto without departing from the spirit and scope of the invention as defined in the appended claims.

What is claimed is:

1. A brushcutter comprising:
   a supporting tube defining a longitudinal axis and having a first end and a second end;
   a motor mounted to said supporting tube at said first end thereof;
   a cutterhead mounted to said supporting tube at said second end thereof, said cutter head including cutting tool means;
   a drive shaft mounted in said supporting tube for connecting said motor to said cutting tool means for driving the latter;
   a handle mounted on said supporting tube for manipulating the brushcutter during the operation thereof, said handle including a tubular-shaped handle portion surrounding said supporting tube;
   said tubular-shaped handle portion including a first clamshell and a second clamshell conjointly defining a partition plane lying in the direction of said axis; and,
   a plurality of control components mounted on said handle portion for controlling the operation of the brushcutter, said control components being mounted exclusively in said first clamshell.

2. The brushcutter of claim 1, comprising mounting means for mounting said first clamshell without shifting directly onto said supporting tube; and, fastening means for fastening said second clamshell to said first clamshell.

3. The brushcutter of claim 2, said mounting means being disposed entirely on said first clamshell; and, said fastening means including receiving means formed on said first clamshell; and a plurality of fasteners for engaging said receiving means.

4. The brushcutter of claim 2, said control components including a gas lever and a switch mounted in said first clamshell; said control parts further including a Bowden cable attached to said gas lever; and a cable leading to said switch; and, holding means for holding said Bowden cable and said switch in said first clamshell so as not to separate therefrom when said second clamshell is removed from said first clamshell.

5. The brushcutter of claim 2, said first and second clamshells having respective flat edges in said partition plane and in mutual contact when said tubular-shaped handle portion is in its assembled condition; said first and second clamshells having respective corners in said partition plane; and, said fastening means including: receiving means formed in the corners of said first clamshell and a plurality of threaded fasteners mounted in the corners of said second clamshell so as to extend across said partition plane to engage corresponding ones of said receiving means.

6. The brushcutter of claim 1, said first and second clamshells being made of plastic.

7. The brushcutter of claim 2, said mounting means including: a pipe clamp; a threaded member for clamping said pipe clamp tightly onto said supporting tube; and, a receiving bushing formed in said first clamshell for receiving said threaded fastener in threaded engagement therewith.

8. The brushcutter of claim 7, said receiving bushing being formed integrally with said first clamshell so that said bushing and said first clamshell conjointly define a single part.

9. The brushcutter of claim 4, said first clamshell having separate pass-through openings formed in one end thereof for accommodating said Bowden cable and said electrical cable, respectively, therein.

10. The brushcutter of claim 9, comprising a holding sleeve for holding said Bowden cable at its outer jacket in the pass-through opening corresponding thereto.

11. The brushcutter of claim 2, comprising access means formed in one of said clamshells for facilitating access to said holding means whereby said mounting means can be loosened to enable said first and second clamshells to be conjointly rotated about said longitudinal axis so as to adjust the angular position of said tubular-shaped handle portion on said supporting tube.

* * * * *

UNITED STATES PATENT AND TRADEMARK OFFICE
CERTIFICATE OF CORRECTION

PATENT NO. : 4,761,939

DATED : August 9, 1988

INVENTOR(S) : Gerhard Zerrer

Page 1 of 2

It is certified that error appears in the above-identified patent and that said Letters Patent is hereby corrected as shown below:

In column 1, line 30: insert -- the -- between "of" and "kind".

In column 3, line 12: delete "if" and substitute -- of -- therefor.

In column 3, line 16: delete "piviotable" and substitute -- pivotable -- therefor.

In column 4, line 3: delete "clamshell" and substitute -- clamshells -- therefor.

In column 4, line 19: delete "cut out" and substitute -- cutout -- therefor.

UNITED STATES PATENT AND TRADEMARK OFFICE
CERTIFICATE OF CORRECTION

PATENT NO. : 4,761,939

DATED : August 9, 1988

INVENTOR(S) : Gerhard Zerrer

It is certified that error appears in the above-identified patent and that said Letters Patent is hereby corrected as shown below:

In column 4, line 44: delete "cutter head" and substitute -- cutterhead -- therefor.

In column 5, line 6: delete "and".

In column 5, line 13: insert -- being -- between "and" and "in".

Signed and Sealed this

Ninth Day of January, 1990

Attest:

JEFFREY M. SAMUELS

Attesting Officer    Acting Commissioner of Patents and Trademarks